Patented Aug. 9, 1932

1,870,453

UNITED STATES PATENT OFFICE

HERBERT HÖNEL, OF VIENNA, AUSTRIA, ASSIGNOR TO BECK, KOLLER & COMPANY, INC., OF DETROIT, MICHIGAN, A CORPORATION OF DELAWARE

ARTIFICIAL MASS AND PROCESS OF MAKING THE SAME

No Drawing. Application filed May 20, 1930. Serial No. 454,186.

The invention relates to improvements in artificial resin-like masses and to the process of making the same. The present application is related to and is a continuation in part of my application Serial No. 362,460, filed May 20, 1930, now Patent 1,800,296, dated April 14, 1931.

When phenol alcohols are heated at temperatures between 120 to 180° C., it is a well known fact that they condense to hard infusible insoluble resinous masses, mostly by splitting off of formaldehyde. It has been found that phenol alcohols heated together with bodies of the formula

$$HOOC.R.COO.C_nH_{(n+2)}(OH)_{(n-1)}$$

where R represents a polyvalent hydrocarbon radicle create a uniform reaction mass.

According to the proportions used, the resulting product is either still soluble or swells in solvents and is gelatinous and constitutes a hygroscopic mass. In any case the product is uniform and clear. It has also been found that the gelatinization which occurs at higher temperatures when using large quantities of phenol alcohol does not take place if suitable amounts of a higher molecular monobasic carboxylic acid are present. These amounts may desirably be added to the reacting mass just as the coagulation begins. In some cases it is even possible to dissolve a mass which is insoluble in the common solvents in said carboxylic acids under heat. For this reaction fresh natural resinous acids and the fatty acids of castor oil are most suitable, while other fatty acids such as are obtained from natural fats or from drying or semi-drying or non-drying fatty oils show this quality in a lesser degree.

If the total reacting mass is now subjected to esterification after addition of further amounts of polybasic alcohol, very high molecular, high colloidal bodies are obtained, which constitute highly satisfactory bases for varnishes and similar finishes. It is necessary that a sufficient amount of monobasic carboxylic acids be added to the reacting mass, otherwise coagulation may again occur during the course of esterification. These monobasic carboxylic acids may be wholly or partly substituted by their natural glycerides.

Among the commercial advantages of said process is the fact that through the use of comparatively small amounts of certain herein described bodies the low priced natural raw materials of the varnish industry can be transformed to highly valuable products. The cheapest type of technical phenols can be used for this process. In this connection it should be mentioned that even low grade drying or semi-drying oils can be used with good results for baking enamels and other purposes.

By phenol alcohols I mean more or less low molecular non-resinous condensation products obtained from all kinds of phenols and formaldehyde by means of alkali catalysts according to well known methods.

I may use in my process common phenols or technical phenol mixtures which have preferably all the particularly reactive positions unsubstituted. These phenols generally represent the cheapest types and produce the highest yields, but it will be understood that other phenolic bodies, such, for example, as those described in my copending application Serial No. 362,460, filed May 11, 1929, now Patent 1,800,296 dated April 14, 1931, may be employed, with good results.

The above mentioned body

$$HOOC.R.COO.C_nH_{n+2}(OH)_{n-1}$$

or a mixture of the possible isomeres, is obtained most readily by heating the anhydride of a dibasic carboxylic acid for a short time with a polyhydric alcohol in approximately equimolecular proportions to 150-180° C. until a drop stays clear when cold without showing crystalline turbidity. The acid number of this oily or semi-solid mass indicates that it is an acid mono-ester, the preparation of which is analogous to the already known preparation of acid esters of monovalent alcohols.

One can also start from dibasic acids themselves and continue the esterification until the acid number is about in accordance to the mono-ester. The further esterification takes place comparatively slowly. This one-sided esterification can also be carried out in the presence of the monobasic carboxylic acids, as their esterification takes place much more slowly. This is especially true of natural resin acids. If only a small part of the monobasic acid reacts with an alcoholic group of said "carboxylic-acid-ester-alcohol-body", this fact will not influence the process in principle. It is sometimes desirable that the reacting mass on which the phenol alcohol reacts, should be a uniform mixture under heat. It is not surprising that above mentioned natural resin acids can be used in my process, since another process is known in which these alone react with phenol alcohols, producing considerably higher melting resins. But only a comparatively small amount of phenol alcohol will react alone with the rosin. The use of a larger quantity resulted in the formation of useless sago-like or crumbling masses which were undesirable, while a reaction with the rosin did not take place. On the other hand, the amounts of phenol alcohols, as compared with the resin acids, may be increased considerably, according to my process, to a multiple of the quantity previously usable, without the slightest formation of said sago-like particles. This possibility allows the creation of said specially high molecular bodies as explained above. It should be mentioned that the process is not limited to the presence of fresh natural resin acids, and I have discovered the surprising fact that phenol alcohols obtained from phenols with three particularly reactive positions in the molecule can react with higher fatty acids in the presence of said "carboxylic acid-ester-alcohol body". Even the presence of a considerable amount of the glyceride itself does not cause the phenol alcohol of the character mentioned to react with itself and to create sago-like masses. With certain restrictions results may be obtained by my present process similar to those described in my Patent 1,800,296, dated April 14, 1931. When larger amounts of glyceride of fatty acid are present one can not use phenol alcohols of all types of phenols but only those with two particularly reactive positions in the molecule as explained in my Patent 1,800,296, dated April 14, 1931. These phenol alcohols can be incorporated in the reacting mass at any time, i. e. even when the acid number of the mass is still comparatively high, after which the esterification can be started or continued. Or, phenol alcohols of this type may be incorporated after having reached a low acid number in the limited sense of the process described in my Patent 1,800,296, dated April 14, 1931.

The products obtained according to my improved process as such, constitute excellent bases for varnish-like products. The application and uses of these conform with those of the usual types.

Several examples may explain the process:

*Example 1.*—100 parts phthalic anhydride (99%), 63 parts glycerine (98%) are heated together to 160–170° C. In the beginning a sample will cloud immediately when cold through formation of microscopic crystals. After 10 to 15 minutes a sample will stay clear when cold. The reacting product has an acid number of approximately 228 which conforms exactly with the acid number of the mono-ester. 60 parts of linseed oil fatty acids and 60 parts of American rosin M are then added and melted. Under constant stirring at 160–180° C. a liquid condensation product obtained from 35 parts of a technical mixture of m-p-cresol and 40 parts of formaldehyde (40 volume %) is slowly added. While the acid phthalic ester, the rosin and the fatty acids are only partly soluble with each other forming two different layers, they are a uniform mass after incorporation of the phenol alcohol. The temperature is now increased and at 200° C. 120 parts of linseed oil are slowly added, at the time being careful that the reacting mass always stays clear when hot. Increase the temperature to 280° C. and hold for several hours at this temperature during which period the viscosity of the product increases owing to the content of polymerizing fatty acid groups. The product is soluble in aromatic hydrocarbons or in mixtures of these with aliphatic hydrocarbons and dries with a sufficient amount of driers to a very hard varnish. It is characteristic of my process that turbidity is noticed in the reacting mass when an acid number of approximately 30 is reached. This turbidity soon concentrates to little glossy flakes while the mass was absolutely clear at higher acid numbers. These flakes can be fully dissolved through the addition of a little glycerine. In a solution of this product the flakes settle out readily. It should be mentioned that after the reaction with the phenol alcohols practically no phthalic anhydride sublimes out of the hot mass, while a reacting mass made from the same starting materials but without phenol alcohol will sublime phthalic anhydride to a considerable extent.

*Example 2.*—100 parts phthalic anhydride, 80 parts glycerine, 400 parts American wood rosin I are heated together up to 160–170° C. until a sample shows an acid number of approximately 180. Now incorporate a thin flowing condensation product made from 100 parts of USP cresol and 150 parts of formaldehyde (40 volume %) mixed with 10 parts of glycerine at a temperature of 160–200° C. while stirring. The melt will become so viscous that it is advisable to add approximately 100 parts of China wood oil or the fatty acids of the same and a corresponding amount of glycerine during the incorporation of the phenol alcohols. Now add: 350 parts linseed oil and an additional 50 parts of China wood oil and esterify the total mass at a temperature from 240-270° C. at which point re-esterification probably takes place. The formation of flakes described in Example 1 is here more prominent after reaching lower acid numbers than in Example 1 and can also be done away with by the addition of glycerine. Though this varnish contains a considerable amount of China wood oil it dries also at considerably increased temperature to produce a smooth film.

*Example 3.*—Substitute in Example 2 300 parts of linseed oil by 300 parts of castor oil. It is to be noted that said turbidity and formation of flakes is not noticed in this case. This mass also produces a hard and tough drying varnish with driers.

*Example 4.*—100 parts of phthalic anhydride, 70 parts of glycerine are heated together as in Example 1. Add 400 parts of castor oil fatty acids which can be mixed clear with the reaction product of phthalic anhydride and glycerine. Add a phenol alcohol obtained from 60 parts of cresol USP and 90 parts of formaldehyde (30%) and cause it to react at usual temperatures. Afterwards add 30 parts of glycerine and esterify at temperatures from 200-240° C. A clear brown viscous mass is obtained which can be used as a base for varnishes etc. and dries after the addition of driers at elevated temperatures to a very elastic film.

About half the amount of the fatty acids can be substituted by the castor oil itself.

In the above mentioned example the glycerine may be replaced by ethylene glycol. By a corresponding increase of the amount of phenol alcohol a product similar to that above mentioned will be obtained.

*Example 5.*—50 parts of maleic anhydride, 50 parts of glycerine are heated for several minutes at about 160° C. until a clear oily product is obtained which has an acid number of about 280. 500 parts of American wood rosin and 150 parts of China wood oil fatty acids are melted and combined with the above reaction product. A liquid condensation product obtained from 120 parts of cresol USP and 160 parts of formaldehyde (40 volume %) is caused to react by stirring together with the above ingredients. When the reacting mass appears uniform when hot, add 50 parts of China wood oil and 550 parts of linseed oil and additional 60 parts of glycerine and esterify the whole reaction mass. The resulting product has excellent properties as a base for varnishes etc.

It should be mentioned that in absence of the small amount of the acid maleic ester only about half of the phenol alcohol can react with rosin used. An increase is useless and undesirable owing to the formation of sago-like masses. In the presence of China wood oil fatty acids even smaller amounts of phenol alcohol will cause said appearance.

*Example 6.*—40 parts of camphoric acid, 20 parts of glycerine, 120 parts of American or French rosin N, 30 parts of corn oil fatty acids are heated together to 170-180° C. until an acid number of about 180-190 is reached. Incorporate as previously described in the other examples a liquid condensation product obtained from 30 parts of phenol and 42 parts of formaldehyde (30%) further add 12 parts of glycerine and 80 parts of corn oil. Raise the temperature gradually to 280° C. and hold it until a sample shows rubber like consistency. The product is soluble in petroleum hydrocarbons and very useful as a base for enamels etc.

The terms "American wood rosin" and "French rosin N" will be understood by those skilled in the art. By "American wood rosin" as employed in the specification, I have reference to colophony or rosin, generally of American origin, extracted from roots or stumps, while the term "French rosin N" refers to gum rosin procured from living trees.

It will also be understood that unless otherwise specifically stated, the proportions of the various ingredients given in the examples refer to weight rather than volume.

The term "low molecular" as employed in the specification and claims with reference to phenol alcohols, relates to non-resinous condensation products obtained from phenols and aldehydes according to well-known methods. Where the term "relatively low molecular acids" is employed, such term is intended to designate carboxylic acids such as maleic, phthalic, camphoric and the like, having respectively 4, 8 and 10 carbon atoms in their molecules, i. e. 2, 4 and 5 atoms respectively for each carboxylic group, as distinguished from the "relatively high molecular" acids, such as colophony or the fatty acids of natural fats and of drying or semi-drying or non-drying fatty oils, in which the number of carbon atoms in the molecule generally ranges between 16 and 20 representing also the number of carbon atoms for each carboxylic group. Where the term "high molecular" is employed with reference to the final esterification product obtained by the process, this term is intended to designate the resinous quality of the product, as distinguished from the non-resinous or low molecular phenol alcohols employed as starting materials.

What I claim is:

1. A process of making artificial masses which comprises forming a mono-ester from a relatively low molecular polybasic carboxylic acid and a polyhydric aliphatic alcohol, adding a high molecular monobasic carboxylic acid, reacting the mixture with a phenol alcohol and finally esterifying the entire mass by heating.

2. An artificial mass such as is produced according to claim 1.

3. A process of making artificial masses which comprises forming a mono-ester from a relatively low molecular polybasic carboxylic acid and a polyhydric aliphatic alcohol, reacting the ester with a phenol alcohol, dissolving the reaction product in a high molecular monobasic carboxylic acid with the aid of heat, and then esterifying the entire mass by heating.

4. An artificial mass such as is produced according to claim 3.

5. A new composition of matter formed by the reaction of a high molecular monobasic carboxylic acid and a phenol alcohol with a mono-ester of a relatively low molecular polybasic carboxylic acid and a polyhydric aliphatic alcohol.

6. A process of making artificial masses which comprises reacting together a high molecular monobasic carboxylic acid and a phenol alcohol with a mono-ester of a relatively low molecular polybasic carboxylic acid and a polyhydric aliphatic alcohol.

7. A process of making artificial masses which comprises reacting together a high molecular monobasic carboxylic acid, a relatively low molecular dibasic carboxylic acid, a polyhydric aliphatic alcohol and a phenol alcohol.

8. An artificial mass such as is produced according to claim 7.

9. A process of producing artificial masses which comprises reacting together (1) at least one member of a group consisting of high molecular monobasic carboxylic acids and their natural glycerides, (2) at least one member of a group consisting of relatively low molecular polybasic carboxylic acids and anhydrides, (3) a polyhydric alcohol, and (4) a phenol alcohol.

10. A process as set forth in claim 9, wherein the anhydride employed is phthalic anhydride.

11. A new composition of matter such as is formed by the reaction of (1) at least one member of a group consisting of high molecular, monobasic carboxylic acids and their natural glycerides, (2) at least one member of a group consisting of relatively low molecular polybasic carboxylic acids and anhydrides, (3) a polyhydric alcohol, and (4) a phenol alcohol.

12. A composition of matter as set forth in claim 11, wherein the low molecular carboxylic anhydride is phthalic anhydride.

13. A process of producing artificial masses, which comprises reacting high molecular monobasic carboxylic acid, maleic anhydride, glycerine, and a phenol alcohol.

14. A process of producing artificial masses, which comprises reacting camphoric acid, glycerine, high molecular monobasic carboxylic acid, and a phenol alcohol.

15. A new composition of matter such as is formed by the reaction of a high molecular monobasic carboxylic acid, maleic anhydride, glycerine, and a low molecular phenol formaldehyde condensation product.

16. A new composition of matter such as is formed by the reaction of a high molecular monobasic carboxylic acid camphoric acid, glycerine, and a low molecular phenol formaldehyde condensation product.

In testimony whereof I affix my signature.

HERBERT HÖNEL.